(12) United States Patent
Robertson et al.

(10) Patent No.: US 12,417,529 B2
(45) Date of Patent: *Sep. 16, 2025

(54) SYSTEMS AND METHODS FOR CREATING REPLACEMENT VEHICLE KEYS AND FOR AUTOMATED DELIVERY OF KEY PRODUCTS

(71) Applicant: iKeyless, LLC, Louisville, KY (US)

(72) Inventors: Douglas Lawrence Robertson, Crestwood, KY (US); Jon Determann, Louisville, KY (US); Adam Lee Pizer, Louisville, KY (US)

(73) Assignee: IKEYLESS, LLC, Louisville, KY (US)

( * ) Notice: Subject to any disclaimer, the term of this patent is extended or adjusted under 35 U.S.C. 154(b) by 293 days.

This patent is subject to a terminal disclaimer.

(21) Appl. No.: 17/818,711

(22) Filed: Aug. 9, 2022

(65) Prior Publication Data
US 2023/0206421 A1   Jun. 29, 2023

Related U.S. Application Data

(63) Continuation-in-part of application No. 16/898,251, filed on Jun. 10, 2020, now Pat. No. 11,440,107.

(60) Provisional application No. 62/859,579, filed on Jun. 10, 2019.

(51) Int. Cl.
*G06T 7/00* (2017.01)
*G06Q 10/083* (2024.01)

(52) U.S. Cl.
CPC .......... *G06T 7/001* (2013.01); *G06Q 10/083* (2013.01); *G06T 2207/30168* (2013.01)

(58) Field of Classification Search
CPC .......... G06T 7/001; G06T 2207/30168; G06Q 10/083
See application file for complete search history.

(56) References Cited

U.S. PATENT DOCUMENTS

| | | | |
|---|---|---|---|
| 2,582,012 A | 1/1952 | Currier | |
| 3,323,420 A | 6/1967 | Roxburgh | |
| 3,413,892 A | 12/1968 | Casey | |
| 3,442,174 A | 5/1969 | Weiner et al. | |
| 3,796,130 A | 3/1974 | Gartner | |
| 6,065,911 A | 5/2000 | Almblad | |
| 8,532,809 B2 | 9/2013 | Freeman | |
| 9,468,982 B1 | 10/2016 | Mueller et al. | |
| 9,656,332 B2 * | 5/2017 | Bass | B23C 3/35 |
| 9,895,753 B2 | 2/2018 | Huss et al. | |
| 2009/0228795 A1 | 9/2009 | Bass | |

(Continued)

FOREIGN PATENT DOCUMENTS

| | | |
|---|---|---|
| EP | 0 492 372 A2 | 7/1992 |
| EP | 3 412 389 A1 | 12/2018 |

(Continued)

*Primary Examiner* — Siamak Harandi
(74) *Attorney, Agent, or Firm* — Gray Ice Higdon

(57) ABSTRACT

The present invention generally relates to the field of replicating or copying keys. More specifically, the present invention relates to creating a copy of a master key based on a captured image of the master key. The present invention identifies a set of target key information based on the image of the master key to provide for the cutting of a duplicate key blade copy to be shipped to a user. Additional key information may also be captured along with the image of the master key.

11 Claims, 13 Drawing Sheets

(56) References Cited

U.S. PATENT DOCUMENTS

| | | |
|---|---|---|
| 2011/0297691 A1 | 12/2011 | Freeman |
| 2011/0301738 A1 | 12/2011 | Freeman |
| 2013/0138243 A1 | 5/2013 | Freeman |
| 2013/0170693 A1 | 7/2013 | Marsh |
| 2013/0173044 A1* | 7/2013 | Marsh .................. B23C 3/35 |
| | | 700/186 |
| 2014/0377027 A1 | 12/2014 | Burkett et al. |
| 2015/0050094 A1 | 2/2015 | Gerlings |
| 2016/0114412 A1* | 4/2016 | Bosch .................. G01B 11/303 |
| | | 356/601 |
| 2017/0225242 A1 | 8/2017 | Spangler |
| 2018/0061073 A1* | 3/2018 | Little .................... G06T 7/001 |
| 2018/0079014 A1 | 3/2018 | Marsh |
| 2018/0264561 A1 | 9/2018 | Schmidt |
| 2018/0350243 A1* | 12/2018 | Priest .................. G08G 5/0034 |

FOREIGN PATENT DOCUMENTS

| | | |
|---|---|---|
| EP | 3 412 405 A1 | 12/2018 |
| EP | 3 412 406 A1 | 12/2018 |
| EP | 3 466 577 A1 | 4/2019 |
| GB | 952978 A | 3/1964 |
| GB | 2 293 341 A | 3/1996 |
| GB | 2563224 A | 12/2018 |
| GB | 2564556 A | 1/2019 |
| GB | 2564557 A | 1/2019 |
| GB | 2567194 A | 4/2019 |
| WO | WO 99/55482 A1 | 11/1999 |
| WO | WO 2008/066857 A2 | 6/2008 |
| WO | WO 2011/153473 A2 | 12/2011 |
| WO | WO 2012/170321 A2 | 12/2012 |
| WO | WO 2012/103774 A1 | 7/2013 |

* cited by examiner

MOBILE APP/USER FLOW
Order Completion

SYSTEMS AND METHODS FOR CREATING REPLACEMENT VEHICLE KEYS AND FOR AUTOMATED DELIVERY OF KEY PRODUCTS

CROSS-REFERENCE TO RELATED APPLICATION

The present invention claims the benefit of priority to U.S. Prov. Pat. App. No. 62/859,579, entitled SYSTEMS AND METHODS FOR CREATING REPLACEMENT VEHICLE KEYS, Robertson et al., filed 10 Jun. 2019, and to U.S. patent application Ser. No. 16/898,251, entitled SYSTEMS AND METHODS FOR CREATING REPLACEMENT VEHICLE KEYS, Robertson et al., filed 10 Jun. 2020, both of which are incorporated by reference herein in the entirety.

FIELD OF INVENTION

The present invention generally relates to the field of replicating or copying keys. More specifically, the present invention relates to creating a copy of a master key based on a captured image of the master key. The present invention identifies a set of target key information based on the image of the master key to provide for the cutting of a duplicate key blade copy to be shipped to a user. Additional key information may also be captured along with the image of the master key. Delivery of the cut key product may be by drone or other automated delivery apparatus and system.

BACKGROUND OF THE INVENTION

Remote Access systems for consumer vehicles have become a popular, if not essential, feature of most vehicles sold today. Nearly every vehicle on the market for the past several years has included some form of keyless entry as either a standard feature or add-on option. Consumers with older vehicles without remote access systems have been able to retrofit their vehicles with aftermarket systems.

The technologies behind these systems have evolved rapidly with remote systems moving from low security fixed codes with simple transmission schemes to high security encrypted rolling codes with advanced transmission protocols. Developers of these systems, both original equipment manufacturer ("OEM") and aftermarket, have been constantly refining and improving their offerings to take advantage of improvements in technology. Over time, the numerous designs and platforms, coupled with rapidly changing security technologies, have resulted in a great variety of remote devices and systems that are almost universally incompatible across vehicle brands or makes and even between different year and models of vehicles.

Contemporary remote keyless entry systems are designed to be easy to use and secure from attackers. When a user presses a button on his or her keyless remote, an internal microprocessor interprets the request and generates a unique packet of binary data. This packet may contain a unique serial number of the remote, an authentication string, function code, and various checksums. This data packet is then transmitted by the remote via an ultra high frequency radio signal to the vehicle. The user's vehicle can then process the data verifying the remote is authorized and perform the requested action (ex: unlocking a door).

The transmitted radio signal could be monitored by possible attackers so the authentication string is important in maintaining the security of the vehicle. The authentication string often changes with each button press in what is known as a "rolling code". This rolling code prevents an attacker from simply copying and replaying an earlier transmission from the same remote. To prevent an attacker from gathering many samples of the rolling code for analysis, the rolling code is often encrypted with a cipher which completely scrambles the authentication value. In order to process these complex and constantly changing values, the vehicles must share the encryption key used by the remote, the algorithm used to generate the rolling code, and the method for synchronizing to the rolling code.

Additionally, Starting in the early 1990s, car keys began incorporating transponder technology. Transponders are small plastic or glass inserts that are self-contained devices which supplemented the security of the cut key blade. Transponders require no battery and are powered by a low frequency radio signal delivered from a loop of wire around the ignition coil. When a driver starts his or her car, the key blade activates the ignition and the car simultaneously "reads" the transponder via the wire loop to verify the key was authorized to start the car. If the transponder does not "respond" with a valid code (e.g., in the case of hot-wiring a car), the car will shut itself off after a few seconds from starting.

Security transponder evolution has mirrored that of remote keyless entry systems with the first generation being simple, insecure devices that transmitted a fixed value when interrogated by the ignition coil. Much like remote keyless entry, the communication signals can be easily monitored by an attacker with legally available tools. To avoid replay attacks, transponders quickly moved to more complex encryption, such as HITAG and AES, as well as the use of rolling codes. Transponders are now typically highly secure devices capable of bidirectional communication with the vehicle. With the ability for the car to send data to a transponder, some vehicle keys have the ability to store hundreds of bytes of information about the key and vehicle. This information may comprise secret encryption keys and comfort features such as the last radio station used or electronic seat position.

In addition to incorporating transponders with the key blade, remote keyless entry ("RKE") systems and key fobs now incorporate the transponder functionality with remote keyless entry microprocessors on the key blade. The combination of transponder, remote keyless entry microprocessor and system, and key blade forms a combination key where the keyless remote, key blade, and security transponder are packed together into a single device. These devices are both cheaper to produce than keys and remotes and are more secure. The remote keyless entry portion and transponder portion of the key can share information providing for the transponder to receive rolling code and encryption key updates from the vehicle. Using a combination key with the transponder and remote keyless entry system in communication with one another, the rolling code protocols and encryption techniques may become very advanced and unbreakable to all but the most dedicated attacker.

Due to this high margin of security, these devices are not something the lay person could replace or add to their vehicle easily. To pair such a "combo" key to a car requires both a locksmith to cut the blade and specialized programming tools, unavailable to the public, to pair the transponder and remote with the vehicle. Often the vehicle dealer is the only source for keys and pairing tools which leads to high prices for replacement keys/remotes.

Given the complexity of the RKE systems in vehicles, automotive key/remote duplication is a complex and expensive process. Car owners may have a difficult time finding replacement keys and remotes, especially for older vehicles that may no longer be supported by the original manufacturer or automotive dealership.

Once a vehicle owner has located a source for a new RKE device, they must purchase the device and then pay for a locksmith to "pair" the product to the vehicle. This "pairing" process usually involves the use of an expensive dealer owned programming tool or an aftermarket programming tool. In the pairing process, these tools usually connect to the on-board diagnostics ("OBD") port on the vehicle and communicate with various systems within the vehicle to generate a series of encrypted numerical sequences that are combined in various ways to generate unique vehicle codes that are used to authenticate the key or remote with the vehicle. Once generated, these authentication codes are static. If the authentication codes were captured during the pairing process, they would remain valid for later usage. Generally, this conversation between the tool and the vehicle includes a security transponder, the vehicle electronic control unit ("ECU") or body control module ("BCM"), and the RKE device. If this process is not executed properly or a programming fault occurs it is possible to leave the car in a "bricked" state where the vehicle will not start or respond properly to the RKE device. It can be a very expensive process to reset the ECU or body control module of a vehicle.

The problem described above can become even more complicated if the vehicle owner loses their RKE device while traveling to locations where they do not have access to a dealership that can support their vehicle. In this instance, the vehicle owner may be faced with significant towing charges and delays while they wait to have their vehicle key replaced by an authorized dealer. These are only the basic challenges associated with replacing keys and remotes. The key generation and replacement problem is even more complex when viewed from a locksmith perspective.

A wide range of tools and software is required to pair a RKE device to a vehicle. A typical suite of tools may include a very expensive programming tool, software modules to cover various vehicle brands and model years, and a separate OBD port module that performs all or part of the pairing process. Tooling and software costs alone can easily exceed $20,000 if the locksmith wants to service a broad range of vehicles.

In addition to the programming tools and software, locksmiths must provide key blades that come in many types and shapes depending on the manufacturer's requirements for the ignition cylinder. Modern blades are typically milled as opposed to traditional grinding wheel approaches. These special cutting tools are also very expensive.

Once the blade issues are addressed, the locksmith may also be required to purchase PIN codes and wait long periods of time to activate the PIN codes during the pairing process. To recover labor and equipment costs locksmiths typically charge their customers significant fees for their services.

From a customer perspective, other issues may occur that may cause the pairing process to become even more complex. In many cases, when performing the pairing process, the customer must have all their keys and remotes available for the locksmith at the time a key is to be paired to the vehicle. The maximum number of keys that can be paired varies between vehicle makes and models but is normally between 4-6 keys. Some vehicles have "master" and "valet" keys. Valet keys cannot normally be used when pairing new keys to the vehicle so, if the master keys have been lost, a new master key must be first be made. Additionally, some customers may need to have their keys or remotes paired to the vehicle again after a vehicle service or repair if the battery was removed from the vehicle for an extended period.

These issues compound to make for a very challenging and negative experience for the customer when replacing or copying an OEM vehicle key. Customers are forced to source replacement keys from dealers or locksmiths.

One possible solution to some of these issues is the use of a "virtual key" hosted entirely on a smartphone. Many virtual key devices bypass traditional immobilizers and security systems. Some even communicate directly with the BCM or ECU. These approaches may be dependent on networks that lack appropriate levels of security thereby putting the vehicle at risk. Additionally, car companies are constantly designing new systems that are unique to their vehicles and do not rely on traditional RKE solutions. In these cases, the customer is forced to purchase expensive replacement keys/remotes directly from the OEM supplier or dealerships. Smart phone related solutions also rely on phone apps and hardware that may have failure modes due to limited network access at critical times. Battery limitations may also be an issue for smartphone hosted virtual keys. It can be difficult to make the purchasing and pairing of any key, RKE solution, or transponder keyfob, especially a bladed cut key, simple and affordable for a user or consumer.

What is needed is a system and method for a user to remotely order a copy or replacement of a master key. What is needed is a service that enables a user to order a replacement copy of a master key without the burden of locating a replacement product, locating a suitable locksmith, and scheduling a time to have the product paired with the vehicle.

Key products cut at a central facility based on information communicated to a central facility requires delivery to a customer or retail facility for ultimate delivery or pick-up by the customer on a local basis. What is needed is a delivery system adapted to deliver key products to customers or to retail hubs efficiently.

SUMMARY OF THE INVENTION

The present invention provides systems and methods for reproducing vehicle OEM keys from stored data relating to an original vehicle OEM key. The present invention provides for key cutting by photo, which enables users to capture images of their keys at a remote location, e.g., a retail location or by a handheld image capture device such as a cell phone, and have keys cut and then shipped to the user. The system and method of the claimed invention eliminates the need of retailers or other businesses to buy unnecessary and expensive key cutting equipment, carry inventory, and provide extensive employee training for key duplication.

The system of the present invention may be one element or component of an affordable system for the ordering and pairing of replacement keys by a user. The claimed invention provides for the ordering of replacement keys by a user from an application, website, webstore, kiosk, or physical store. The present invention also provides an inexpensive and simplified method for pairing a replacement key with a vehicle, such as by a pairing dongle. The present invention also provides for the cutting of a keyblade on a replacement key without requiring the user to go to a physical store location or have a locksmith perform an expensive and complicated replacement cutting at the consumer's location.

The cutting of a replacement keyblade from a set of stored information reduces the risk of a miscut or incompatible key and reduces the inconvenience for the user in ordering a replacement key.

In one embodiment, a user inputs vehicle make-model-year ("MMY") information on a touchscreen device and inserts a master key of which a copy is to be made into a holder which positions the key into a photo chamber. The system aligns the key relative to the camera and then captures several images in order for an image processing algorithm to identify and store all of the key bitting information that is required to make a copy of the key. Alternatively, the user may use a handheld image capture device and capture a set of photos of the master key which are then processed by an image processing algorithm to identify and store the key bitting information. This may be the preferred method of capturing and processing an image of the key to determine and store bitting information. The system may also prompt the user to adjust the position of the key, adjust the position of the camera, modify the captured image, or make other changes required to obtain an image of the master key that is suitable for further processing. The determination of the bitting information may be done on the device at a retail location, on the handheld device, or it may be done after the images have been uploaded to a server.

After a set of images of the master key to be copied have been captured by the system using either of the embodiments described above, the captured images are sent electronically over a computer network to a central processing server where the images are validated and processed, which can include determination of key bitting information. A new key will be cut and shipped out to the user's location or dispatched to a retail location for pickup upon request by the user or after the image of the master key has been received and processed depending on the order or request type.

For some vehicle master keys, additional information may be captured at the same time the images of the master key are captured. For example, for some keys transponder and rolling code information may be captured by the system such that a copy or clone of the original master key may be produced along with the cut key blade. When that information is not captured with the images of the master key, the user will be sent a programming device with instructions on pairing the newly cut key copy to the user's vehicle.

The system and method of the claimed invention is able to cut a copy of a master key based on a set of images of the master key with a high degree of success. The system and method of the claimed invention is also able to accurately read, transfer, and remotely program key transponder information and other information such as rolling code information for a newly cut key copy. By capturing images of a master key using a handheld image capture device or by using a kiosk at a remote location, the system and method of the claimed invention is able to deliver a replacement cut key copy to a user within 48 hours of a request being received. An order for the cut key copy may be processed and fulfilled within 2 business hours using the system and method of the claimed invention.

The claimed invention is able to create copies from images of master keys for both edge cut and high security key types. The process of actually cutting the key blade copy based on the images of the master key may either be a manual or automatic process, such as by a completely automatic key cutting machine.

Images of the master key may either be a single image, a best image selected from a set of images, or a composite image stitched together and comprised of a set of images forming an ideal target image. A video may also be used to form a complete composite image of a master key. Additionally, other information such as vehicle MMY, vehicle body type, and vehicle identification number ("VIN") information may be captured along with the image or images of the master key to be used to cut a key blade copy.

Processing of the image or images of the master key to be copied comprises the first step of detecting the outline of the key in a 2-D space, broken up into best-fit line segments, then evaluating those segments according to a set of known key blank physical properties and applicable tolerances in order to auto-correct (deskew, stretch/compress), auto-rotate, auto-align, and auto-scale the key image to either the tip or shoulder. The properties considered in this evaluation may include security type (edge-cut or high security), double or single sided, parallel and orthogonal surface locations, blade width, blade tip to shoulder distance, blade tip to first bit distance, blade shoulder to first bit distance, flat widths, cut angles, alignment surfaces (i.e., tip or shoulder), keyway profile, and MMY (in consideration of key wear likelihood and tendency). The second step of determining the grid extents is performed: Parallel lines, one for the top and one for the bottom, are assigned; next, at a right angle to the top and bottom lines, the tip and shoulder (if applicable to the key blank) lines are assigned. For a high security key, instead of the tip and shoulder, the start and end of the cut is assigned. The third step consists of overlaying a "grid" of the key blank's known depth and spacing data (DSD) onto the key image, where edge detection is then used to assign a bit position and bit number, along with a probability. The probability is computed from a combination of known tolerances, thicknesses of detected shadows at each suspected bit position location, degree of agreement between opposite sides (in the case of a 2-sided symmetrical keyway), blade profile differences that can contribute to predictable differences in light and shadow thicknesses, etc. Next, at each bit position, the bit number with the highest probability is output. This is the First Pass Bitting Output. The fourth step enables a pseudo closed-loop bitting determination/validation algorithm, which is iterative in nature and is critical in the evaluation and adjustment of the bitting output of each "pass" to ultimately arrive at the most accurate final bitting output. This algorithm consists of referencing known validation data against each "pass" of the algorithm. This validation data may include the maximum bit value allowed at the first bit position, the minimum and maximum bits values, the number of bits, the maximum adjacent bit variation (MACs), the minimum number of different bit values, the minimum difference between the highest bit value and lowest bit value, the maximum number of repeated adjacent bit values, and the maximum number of times any bit value may appear. Over time, the algorithm may log its iterative failures and final successes to allow for experts to adjust the automatic algorithms, helping to increase the final pass bitting output accuracy.

Alternatively, or in addition, processing of the image or images of the master key to be copied comprises evaluating the image according to key bitting rules and determining if the key bittings determined from the image or images is within acceptable tolerances for a particular key type. This will eliminate invalid key bitting information from a damaged or worn master key from which a key blade copy may not be cut. If an invalid bitting is determined from an image of a master key, an outline of the master key as determined by the system may be modified to create the best possible outline. A set of target key features are determined from this best possible outline to be used to create the key blade copy.

The target key features comprise at least blade rotation, blade top line, blade bottom line, blade tip endpoint, blade shoulder line, shoulder to tip length, and blade width. This set of target key features is then compared to key bitting rules and tolerances to determine if the modified outline is an acceptable outline conforming to key bitting rules and tolerances from which a key blade copy may be cut. For each key type or model of key in the system, the key bitting rules contain measurements and parameters such as number of bits, shoulder to first bit, bit to bit spacing, bit heights as measured from a key-type-defined reference line, and maximum adjacent cut specs (MACS).

When an order for a new key blade copy is placed, a shipping order is created based on stored or entered user information and then a set of shipping labels are generated to be used for shipping the key blade copy to the user. The user's address and vehicle ownership may be validated by the system prior to generating the shipping order information and the shipping labels.

In one exemplary process a user may have a handheld computing device, such as a laptop, tablet, cell phone, or smartphone with image capture capability, with an application installed thereon. When launched, the application provides for a process to begin for the user to capture images of a master key to be used for a key blade copy order. The user may be shown a video or a series of images as instructions for the image capture and order processes.

The user selects or inputs vehicle MMY and the system and application continually updates subsequent selections and options based on the previous selections. The user also inputs name, email address, VIN, shipping address and confirms this information. The email address and shipping address may also be validated. The application then launches an image capture mode and will auto-focus to get the master key in focus, then the user presses a button or interacts with a user interface element in the application to capture an image of the master key with the handheld computing device. The captured image is analyzed in real-time to ensure the image is of the quality needed for further processing and provides input back to the user. The application may notify the user that the picture of sufficient quality or may inform the user that they need to recapture the image.

Image processing algorithms to identify required key cuts includes software and algorithms that validates the captured image of the master key in real time. Additional key alignment algorithms for getting clean edge and surface images are also used. Another algorithm and process are used to identify and fix worn or damaged keys. This algorithm may identify and fix an outline of the master key in the captured image and adjust or geometrically change the outline including by adjusting the cut height to compensate for worn contours. Additional processes may be used to provide for better processing of a captured image, and these processes include limiting or compensating for image parallax, applying digital filters to the captured image, applying color or greyscale modes for higher quality images, applying edge detection and contrast enhancement filters or algorithms, and applying sequential imaging and filtering algorithms.

Once a validated image is complete, the user is notified that they will receive a key programming dongle programmer that will allow them to pair the newly cut key blade copy, which may comprise other components such as a programmable key fob or transponder, to their car themselves. This saves the time and money, and the total price of the key copy includes the price of the programmer included. The programmer includes instructions for pairing the new key copy to the user's vehicle when it is shipped.

The user may be prompted for additional information, such as payment information, to complete an order. This process may be completed entirely on a handheld computing device or may be performed by a stand-alone kiosk, by a combination of a handheld computing device and a stand-alone kiosk, or by a retailer's point-of-sale ("POS") system. After an order has been confirmed the user may be provided with confirmation such as by receiving an email with the order information therein. The email or order confirmation may also comprise a receipt, an estimated shipping date, and contact and support information-such as a sales and support website where a user may view their order and purchase information. After an order has been completed the application resets to an initial state to allow the user to order another key or to allow a different user to order a key.

The replacement key of the present invention works without requiring a "pairing" process. A pairing process for a vehicle key is a multi-step process that typically involves the user performing multiple operations with either the key or vehicle or both that may include opening/closing doors, opening/closing windows, pressing buttons on the vehicle key, operating controls in the vehicle, starting and turning off the vehicle, and also includes authenticating the vehicle key with the vehicle by synchronizing encryption information which may include the entry of a unique PIN. Additionally pairing requires the use of specialized tools that must be connected to either the key, the vehicle, or both and that may only be used by authorized vehicle dealers or locksmiths.

Replacement keys may directly replicate or emulate all features of the vehicle OEM key or may include additional features unique to a universal remote head key ("URHK"). A URHK is a universal key that combines a keyfob/keyless entry system, transponder, and key blade into a single unit that may be programmed and configured to operate with a wide range of vehicle makes and models. URHKs and the systems and methods for programming them are described in METHOD AND APPARATUS FOR IMPLEMENTING MULTI-VENDOR ROLLING CODE KEYLESS ENTRY SYSTEMS, U.S. patent application Ser. No. 14/165,922, filed Jan. 28, 2014, also published as U.S. 2014/0218165, Johnson et al., which is incorporated by reference herein in its entirety. Methods and systems for dongle-based key pairing and programming are described in U.S. Provisional Patent Application No. 62/690,326, entitled SYSTEM AND METHOD FOR PAIRING A KEY WITH A VEHICLE VIA A VEHICLE COMMUNICATIONS PORT BY A DONGLE, Johnson et al., filed Jun. 26, 2018, and in U.S. Provisional Patent Application No. 62/703,669, entitled SYSTEM AND METHOD FOR PAIRING A KEY WITH A VEHICLE VIA A VEHICLE COMMUNICATIONS PORT BY A DONGLE, Johnson et al., filed Jul. 26, 2018, both of which are incorporated herein by reference in their entirety. Replacement keys and related information may be stored in a "key bank" such as described in U.S. Provisional Pat. Application Ser. No. 62/695,620, filed Jul. 9, 2018, and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), and in U.S. patent application Ser. No. 16/153,602, filed Oct. 5, 2018, and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), both of which are incorporated herein by reference in their entirety.

Key products are inherently small in size and low weight making them ideal candidates for delivery by drone or other small delivery device. In connection with the centralized key cutting system, the present invention may also include a delivery system adapted to deliver key products to customers efficiently. For instance, drone delivery systems may be used to deliver key products to retail hubs or directly to customers.

In one embodiment the present invention provides a system for creating a key blade copy of a master key based on a captured image of the master key, the system comprising: a central server having a processor, a memory, and a set of instructions stored on the memory and executed by the processor, the central server connected to a communications network and adapted to receive a set of information from a remote device, the set of information comprising a set of user information and a set of information associated with the master key; a database accessible by the central server and configured to store records related to keys; the central server adapted to receive a set of images of the master key captured by an imaging device associated with the remote device; the processor configured to execute the stored instructions and access key related information stored in the database to cause the central server to: designate an image form the set of images as a target image; retrieve a set of key rules from a database; determine a set of key features of the master key from the target image; identify a first set of faults in the set of key features by comparing the set of key features to the set of key rules; determine a set of key bitting information from the set of key features; store the set of key bitting information and the set of key features in the database; and create the key blade copy of the master key based on the set of stored key bitting information and the set of key features.

The system may be further characterized in one or more of the following: wherein the processor is further configured to process executable instructions to cause the server to: identifying a second set of faults in the set of key bitting information by comparing the set of key bitting information to the set of key rules; and marking the first set of faults and the second set of faults in the target image of the master key; correcting the first set of faults and the second set of faults to generate a best possible geometric outline; updating the set of key features and the set of key bitting information based on the best possible geometric outline; correcting the first set of faults and the second set of faults may comprise adjusting cut height and bitting to compensate for worn contours on the master key; capturing a set of transponder information related to the master key; receiving an order from a user for the key blade copy; creating the key blade copy for the user based on the received order; and shipping the key blade copy to the user; applying an image processing technique to the captured image, the image processing technique selected from the group consisting of: compensating for image parallax, applying digital filters to the captured image, applying color or greyscale modes for higher quality images, applying edge detection and contrast enhancement filters or algorithms, and applying sequential imaging and filtering algorithms; prompting a user to capture an additional set of images of the master key; identifying a faulty image from the set of images based on information associated with an image capture device used to capture the set of images.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
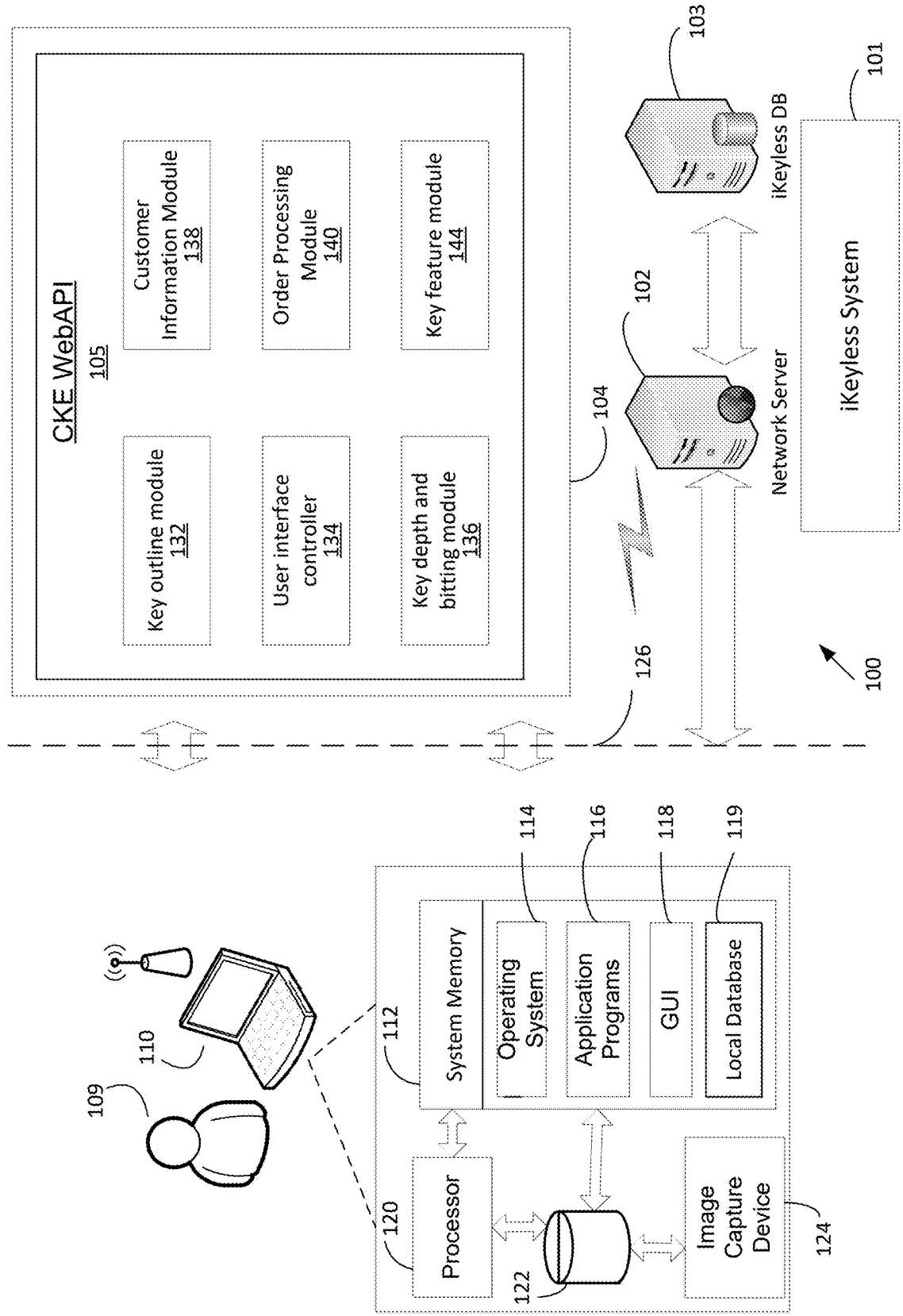
FIG. 1 provides a system diagram for a system for creating replacement vehicle keys according to the present invention.

With reference now to FIG. 1, a system diagram for a system 100 for creating replacement vehicle keys according to the present invention is provided. The system 100 is the iKeyless System 101 for storing and processing user-captured images of master keys to be used in creating key blade copies. The system 100 comprises an iKeyless or Car Keys Express WebAPI (Web Application Program Interface) 105 which may be part of a system environment 104 run on network server 102 and is the conduit, or interface, through which the remote access device 110 and the iKeyless System 101 sends and receives information to/from the iKeyless DB 103. The network server 102 may be in communication with the iKeyless database 103 which stores information used by the iKeyless System 101 and may pre-process captured images for use in creating key blade copies. The network server 102 may comprise a process and a non-transitory memory which stores instructions that, when executed by the processor, transform the network server 102 into a special purpose computing machine. The iKeyless System 101 processes the raw images to identify a set of features associated with a master key in the images. The iKeyless System 101 further comprises a key outline module 132, a customer information module 138, a user interface controller 134, an order processing module 140, a key depth and bitting module 136, and a key feature module 144, the features of which are discussed in further detail hereinbelow.

The iKeyless System 101 may be in communication over a network, such as a local area network, wide area network, or the Internet by connection 126 with a remote access device 110. The remote access device 110 is operated by the user 109 and may be a handheld computing device such as a laptop, tablet, cell phone, or smartphone, or may be a stand-alone computing device such as a computing kiosk, computer, or point-of-sale device. The remote access device 110 comprises a processor 120, system memory 112, local storage 122, and an image capture device 124. Programs and software are loaded from the local storage 122 into the system memory 112 and may comprise an operating system 114, application programs 116, a graphical user interface ("GUI") 118, and local database 119. The application as discussed hereinbelow would be an application program 116 that communicates with the local database 119 and provides a graphical user interface 118 that comprises a set of user interface elements for interacting with the application program. The WebAPI 105 provides a secure encrypted interface, exposed to the web, to/from which the remote access device application can send commands/requests and receive responses. The iKeyless System 101 may be a desktop or a mobile application.

As a desktop application, the iKeyless System 101 may be a software application compatible and compliant with Microsoft Windows operating systems such as Windows 7 and newer, but may also be a web-based software-as-a-service application that is compatible with web-browsers such as Google Chrome, Mozilla Firefox, and Microsoft Edge. The iKeyless System 101 provides for the importing, processing, and manipulation of pictures to find key bitting quickly and effectively. The iKeyless System 101 also provides for the detection of key bitting for house keys such as Schlage and Kwikset. The iKeyless System 101 interfaces with the WebAPI 105 to provide for the encrypted exchange of information between the iKeyless System 101 and the Web API 105. The iKeyless System 101 provides for the input of an order number and a line item number and will retrieve order provided key information ("OPKI") to start a new order including the cutting and preparation of a replacement key. The iKeyless System 101 can use the OPKI, modify the OPKI, and revert back to earlier versions of the OPKI. The OPKI used by the iKeyless System 101 may be confined by or associated with a set of read-only key rules. These key rules comprise one or more of a number of bits, datum location (shoulder or tip), distances of datum to each bit, key bit cut depths max and min as measured from a keyway-defined reference, Maximum Adjacent Cut Specs (MACS), permitted or disallowed bit patterns, flat distance, shoulder to tip distance, blade width, and other applicable rules.

For a new job, within the user interface of the iKeyless System 101, the iKeyless System 101 implements automatic algorithms with manual overrides which are applied to all photos upon import or upon manual adjustment and which comprise: the automatic detection of key features (e.g., tip, shoulder (if applicable), bottom, top, blade width, shoulder to tip distance); the auto-registration of a key image including the auto-rotation of the key, skew detection and auto-adjustment (detection of non-parallel key features) and auto-correction, stretch/compression detection (using, for example, known rules of shoulder to tip distance and blade width) and auto-correction; automatic detection of cut depths with visual indicators of the nominal cut depths for the detected bitting; zoom and pan option to make close-up, fine adjustments to the above features and registration information, and in the zoom mode, all detected key features and key bit cut depths are shown with visually indicated tolerance limits; automatic detection and highlighting of key features and key bit cut depths that break key rules; and the comparison of key bitting of up to 4 other pictures at once to verify bittings are the same through all photos.

For a reorder job using the iKeyless System 101, all previous job data is retrieved and displayed. By default, all automatic algorithms shall be disabled, but may be enabled by the user. Similar to a new job, manual overrides are provided to the user within the user interface for the manipulation of job data and of the image.

The automatic algorithms used by the iKeyless System 101 can, without manual manipulation, extract key cut depths and key bitting data with a high degree of accuracy. Images captured and used for extracting key information including bitting information are saved and stored by the iKeyless System 101. The performance of the iKeyless System 101 may be audited, for example, to determine the performance of the automatic detection and auto-registration algorithms. For an audit, after the initial import of key images and application of all automatic algorithms (which are enabled for new job and disabled for a re-order job), all initial job data (e.g., feature locations, registration information, key bitting, cut depths, breaks rules (yes/no) on a feature by feature and bit by bit basis) is saved locally. Then, upon exiting and/or saving the job, all initial and final job data may be exported via the iKeyless WebAPI 105 and processed externally to determine accuracy.

As a mobile application, the iKeyless System 101 may be a mobile application that is compatible and compliant with at least Apple IOS 12.2 and/or Android 9 standards. The mobile application version of the iKeyless System 101 interfaces with the iKeyless WebAPI 105 to allow encrypted exchange of information. The mobile application for the iKeyless System 101 provides a user interface for a user to create a new account or log into existing account, access previous orders for review of order progress or to re-order, take pictures of existing key, buy new keys, and buy upgrades to previous or existing key products. A user may order automotive keys or house keys through the mobile application. In addition to the features provided by the desktop application version of the iKeyless System 101, the mobile application, and desktop application, also display slides or video clips showing a user how to take the best pictures of their key for the extraction of key information. This may including showing an example of what a "perfect" picture looks like. When taking an image of a key, camera orientation locked so that tilting mobile device will not auto-flip the screen, tilting the phone too far turns the screen red and prevents the taking of a picture, the flash defaults to being on with an option for it to be disabled, and a generic key silhouette is shown on the screen. After a picture is taken the picture displays an animation which traces the key outline to provide an indication to the user that the application has detected the outline of the key.

After key images have been captured and key information or data has been extracted, the user or customer may select an option to not have their key kept on file, to assign a nickname to key, to add a key purchase to a shopping cart, to remove items from the cart, to checkout, and to continue shopping. The user may also presented with one or more "upsell" options to provide the user with the option to purchase additional keys and/or services based on what the customer has selected for purchase. For example, the user may be presented with the option to buy an extra remote for a vehicle, or buy an integrated key and remote instead of a separate key and remote. After an order has been entered, clicking on previous non-fulfilled orders allow user to see progress of order. For example, the user may be shown order statuses including: "Expert reviewing", "Expert cutting", and "Shipped".

Figure 2:
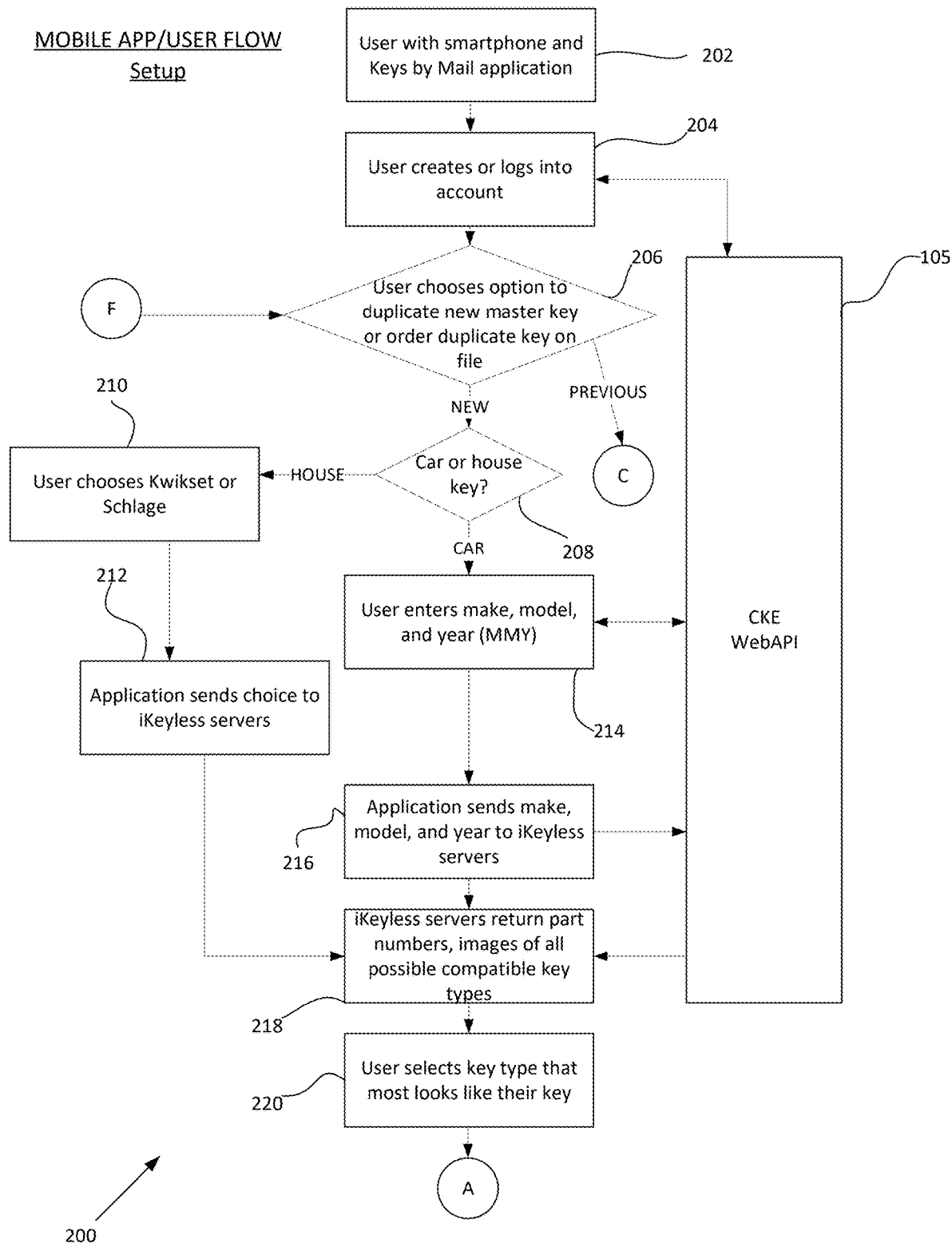
FIGS. 2-4 and 10-11 provide a series of flowcharts illustrating an exemplary process for a user ordering a replacement master key according to the present invention.
Figure 3:
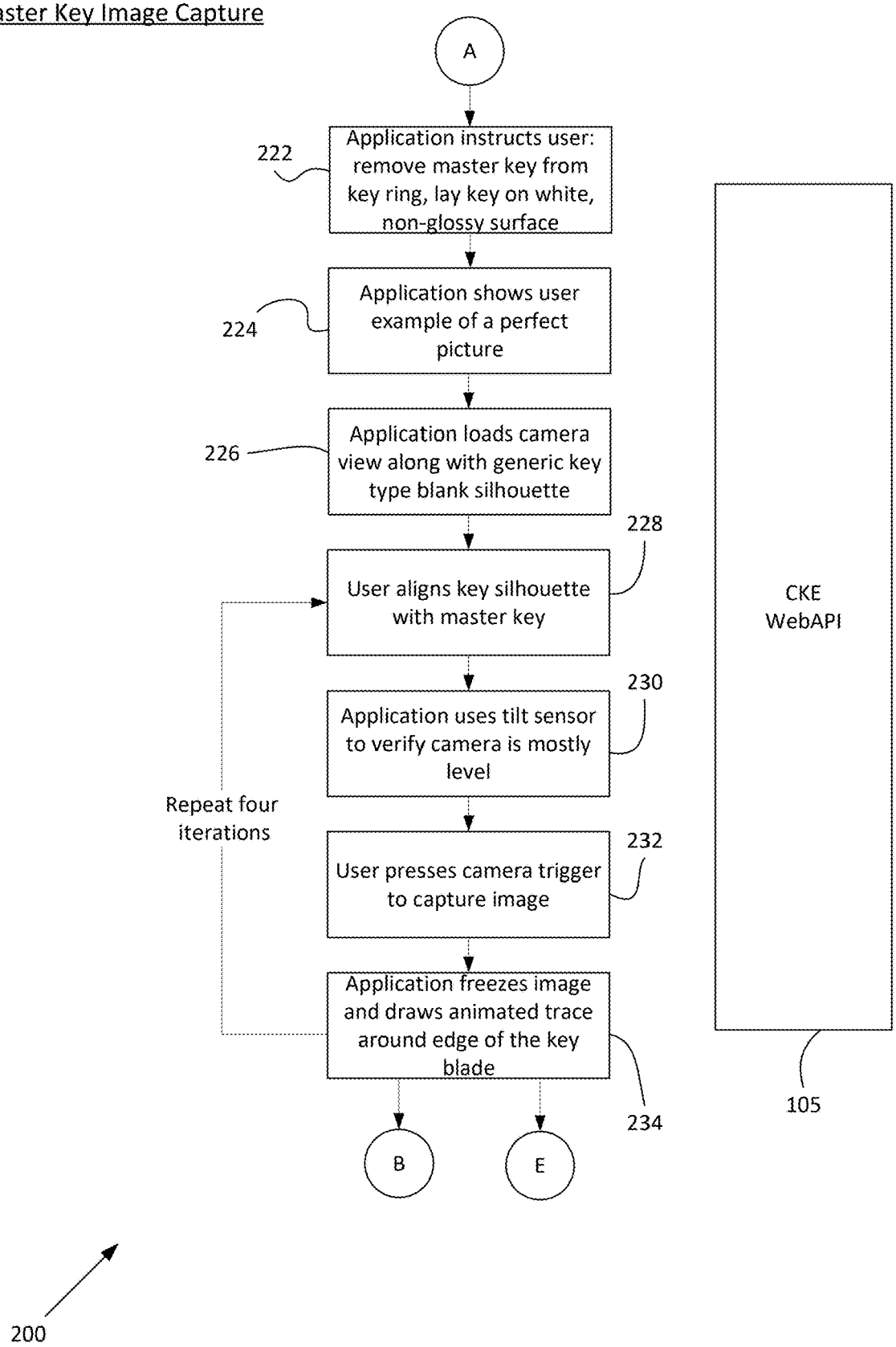
Figure 4:
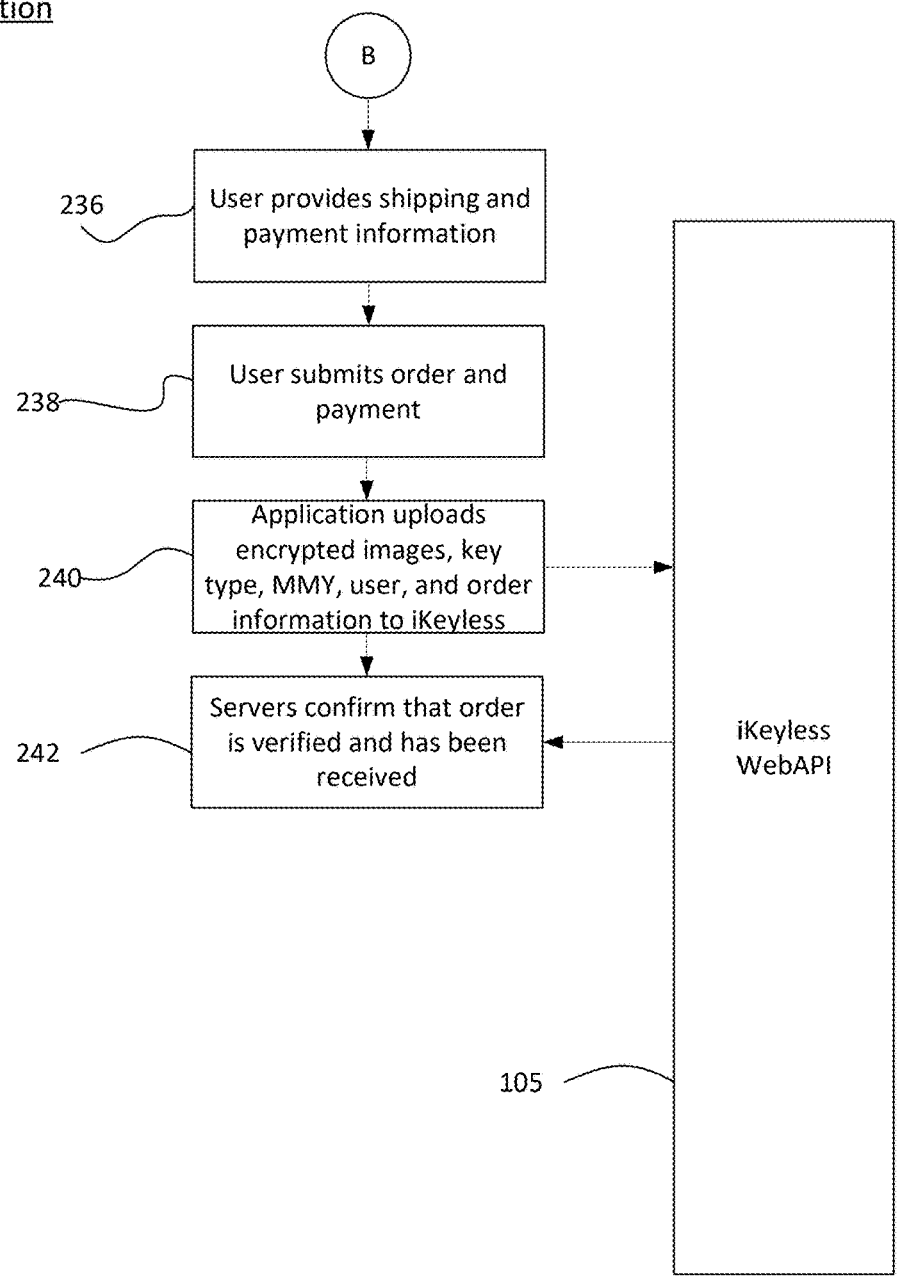

With reference now to FIGS. 2-4 a series of flowcharts illustrating an exemplary process 200 for a user ordering a replacement master key according to the present invention are provided. FIG. 2 illustrates a setup process whereby a user may use an application to capture images of a master key and place an order for a replacement key blade copy based on the captured images of the master key. The application may be called the "Keys by Mail" application and may run on the remote access device 110. In step 202 the user accesses the Keys by Mail application on their device, which may be a smartphone. Then in step 204 the user either creates a new user account or logs into an existing account. The user may be prompted to create a new account if not existing account is detected based on a user entered phone number or email address. The user account information is stored by and accessed from the iKeyless WebAPI 105. Once in the application, in step 206 the user selects from the options of duplicating a new master key or ordering a duplicate key from an existing master key already on file. If ordering a new key the process proceeds to step 208, but if a re-order is selected the process proceeds to step 250 shown in FIG. 10.

Figure 10:
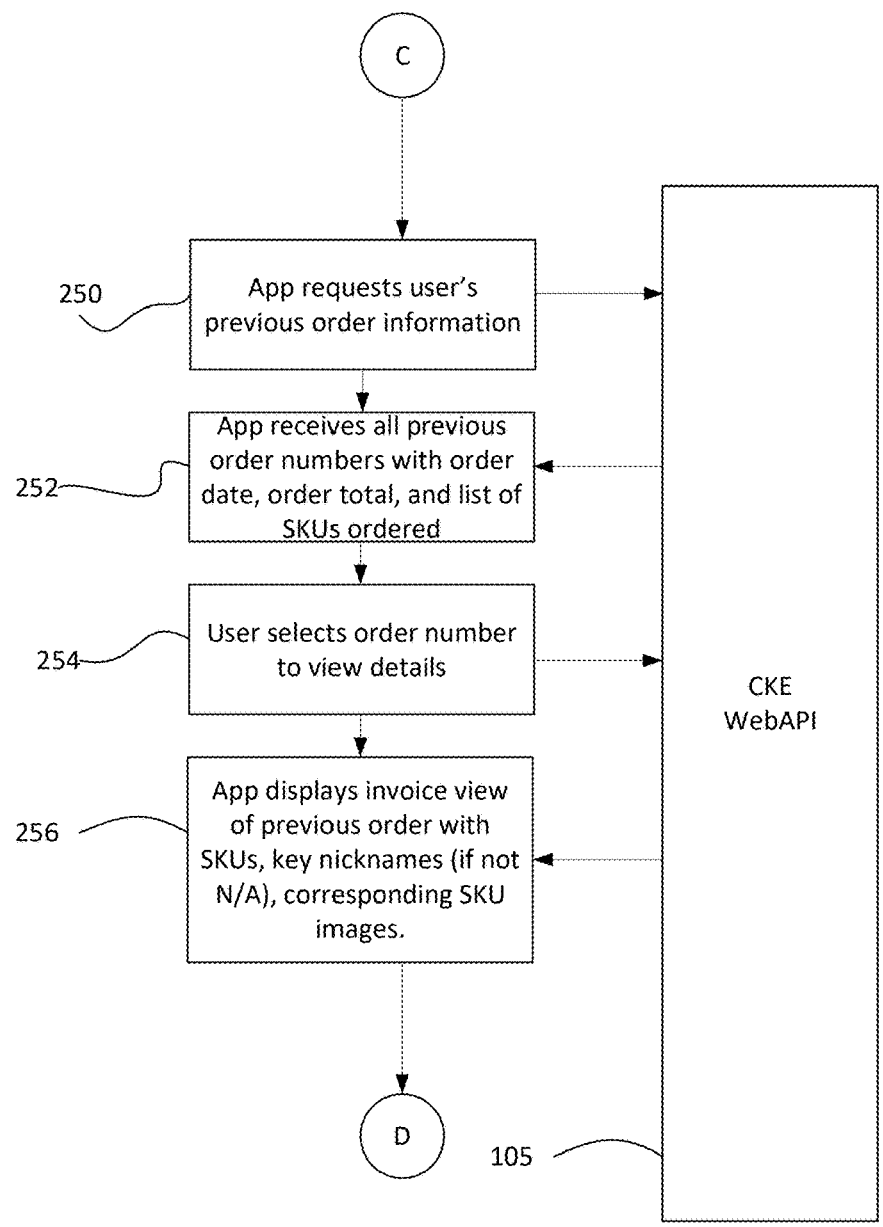

As shown in FIG. 10, if a re-order or information from a previous order is selected, at step 250 the application requests the user's previous order information via the WebAPI 105. The application at step 252 receives the order information which comprises all previous order numbers with order dates, the order totals, and a list of all SKUs ordered. At step 254 the user selects an order number to view a specific order's details. Then in step 256 the application displays an invoice view of a previous order with all SKUs, key nicknames (if assigned) and corresponding SKU images. The process continues in step 260 of FIG. 11, described below.

Returning to FIG. 2, the user may be prompted in step 208 to identify whether the master key to be copied is a vehicle key or a house key. If the key is a house key, in step 210 the user selects the house key type, e.g., Kwikset or Schlage, and then in step 212 the user's choice is sent to the iKeyless WebAPI 105 servers.

If the key is a vehicle key, in step 214 the user is prompted to enter the vehicle MMY and optionally the VIN information. In step 216 the vehicle MMY and VIN information are sent to the iKeyless WebAPI 105 for storage. The user account information creation, storage, and management may be performed by the customer information module 128. Additionally, the customer information module 138 may store and associate any key information entered by the user in the application on the remote access device. After the customer information and key information has been entered and sent to the WebAPI 105, in step 218 the WebAPI returns a set of part numbers, images, and associated descriptions for all possible compatible key types. This includes images of possible key types, vehicle descriptions for possible key types, and other information that may be used by the user to identify the best possible match from the returned set of possible compatible key types. In step 220, the user selects the key type form the set of possible compatible key types that best matches the master key to be copied.

Continuing in FIG. 3, at step 222 the application instructs the user to remove the master key to be copied from their key ring and to place the key on a flat, white, non-glossy surface for the image capture step. In step 224, the application provides the user with an example of an ideal or perfect picture that they should attempt to obtain of the user's master key. Then in step 226 the application access the image capture device 124 and displays the image being received from the image capture device 124 in the graphical user interface 118 on the user's remote access device 110. A silhouette of a generic type key blank is shown or overlaid on the image provided by the image capture device 124 to assist the user in properly aligning their master key. In step 228, the user aligns the overlaid key silhouette with the master key on the flat surface. Then in step 230 the application uses sensors in the remote access device 110, such as tilt sensors or gyroscopes, to verify that the image capture device 124, e.g., a digital camera or digital image sensor, is mostly level. When it is determined that the master key is lined up and that the image capture device 124 is mostly level, in step 232 the user actuates a user interface element or physical button on the remote access device 110 to capture an image. In step 234 the application freezes the captured image in the graphical user interface and draws an animated trace around the edge or outline of the blade of the master key. The steps 228, 230, 232, and 234 may be repeated four or more times to obtain a set of images of the master key from which a target image may be identified.

Figure 11:
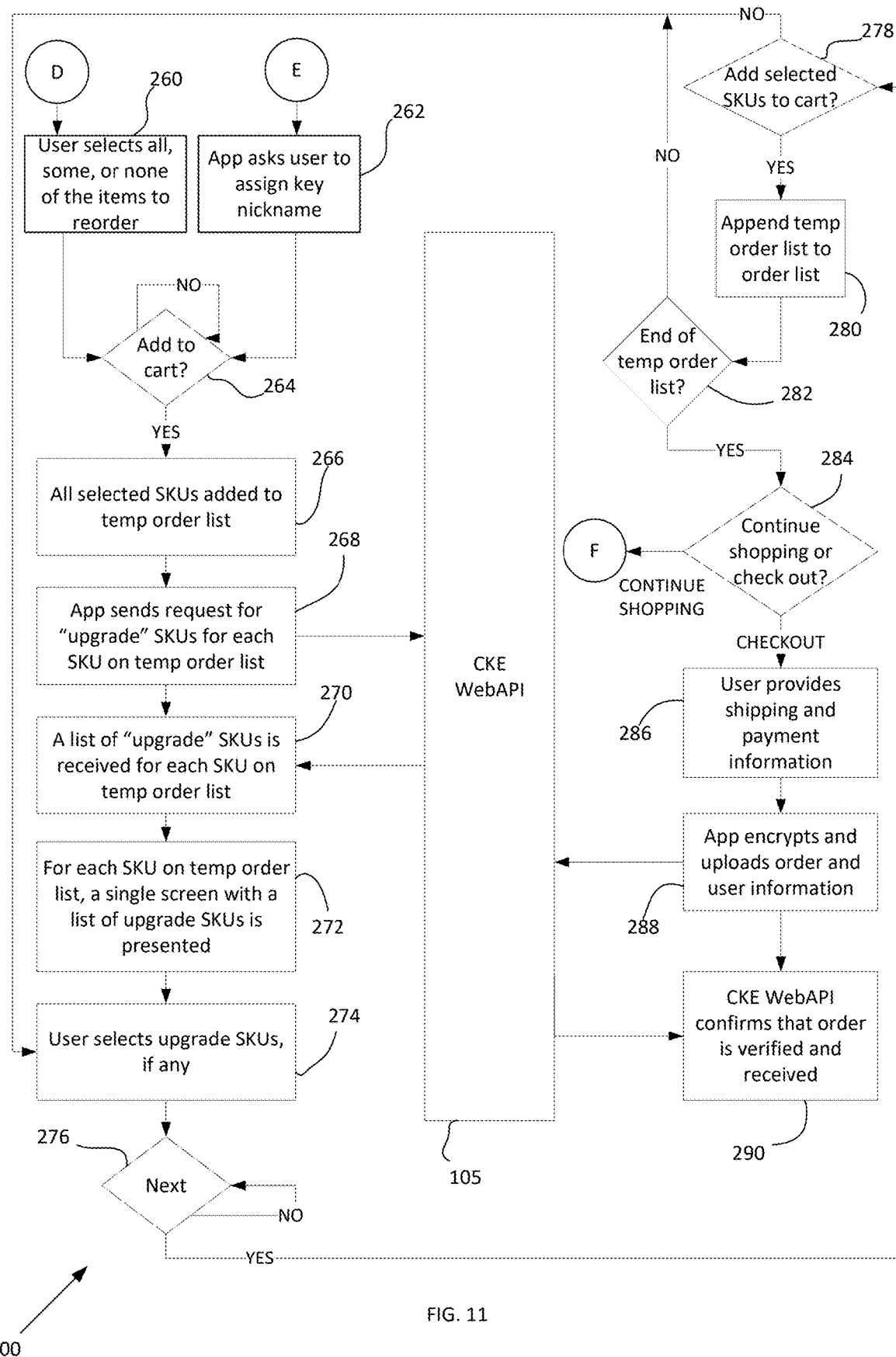

With reference to FIG. 11, in steps 260 or 262, based on whether the order is a reorder job or a new job order, respectively, the user either selects some or all of the items to reorder in step 260 or assigns a nickname to a key in step 262. The key SKU or SKUs selected are then added to a user's cart in step 264. In step 266 all SKUs selected by the user are added to a temporary order list and in step 268 the application sends a request for "upgrade" or "upsell" SKUs for each SKU item on the temporary order list. In step 270 a list of "upgrade" SKUs is received for each SKU on the temporary order list. For each SKU on the temporary order list in step 272 a screen with a list of premium, "upsell", or "upgrade" SKUs is presented to the user and in step 274 the user selects from the available upgrade SKUs which are added to order or shopping cart in steps 276 and 278.

After upsell items have been added to the cart, in step 280 the temporary order list is added to the order list, and at step 282 if the temporary order list is completed the user may continue shopping or checkout in step 284. If the user continues shopping the process returns to step 206 in FIG. 2, and if the user selects checkout the user provides shipping and payment information in step 286. In step 288 the application encrypts and uploads order and user information and in step 290 the order confirmation is received and verified via the WebAPI 105.

Alternatively, after the image of the master key has been captured, in step 236, shown in FIG. 4, the user provides shipping and payment information to the application for the order of a copy of the master key based on the captured image. In step 238, the user submits the order and remits payment for the order. These steps may be processed by the order processing module 140. Then, in step 240 the application uploads the images, key type, vehicle MMY and VIN, user information, and order information to the iKeyless WebAPI 105 for processing. After the order has been processed, in step 242 the server provides confirmation that the order has been verified and received.

Figure 5:
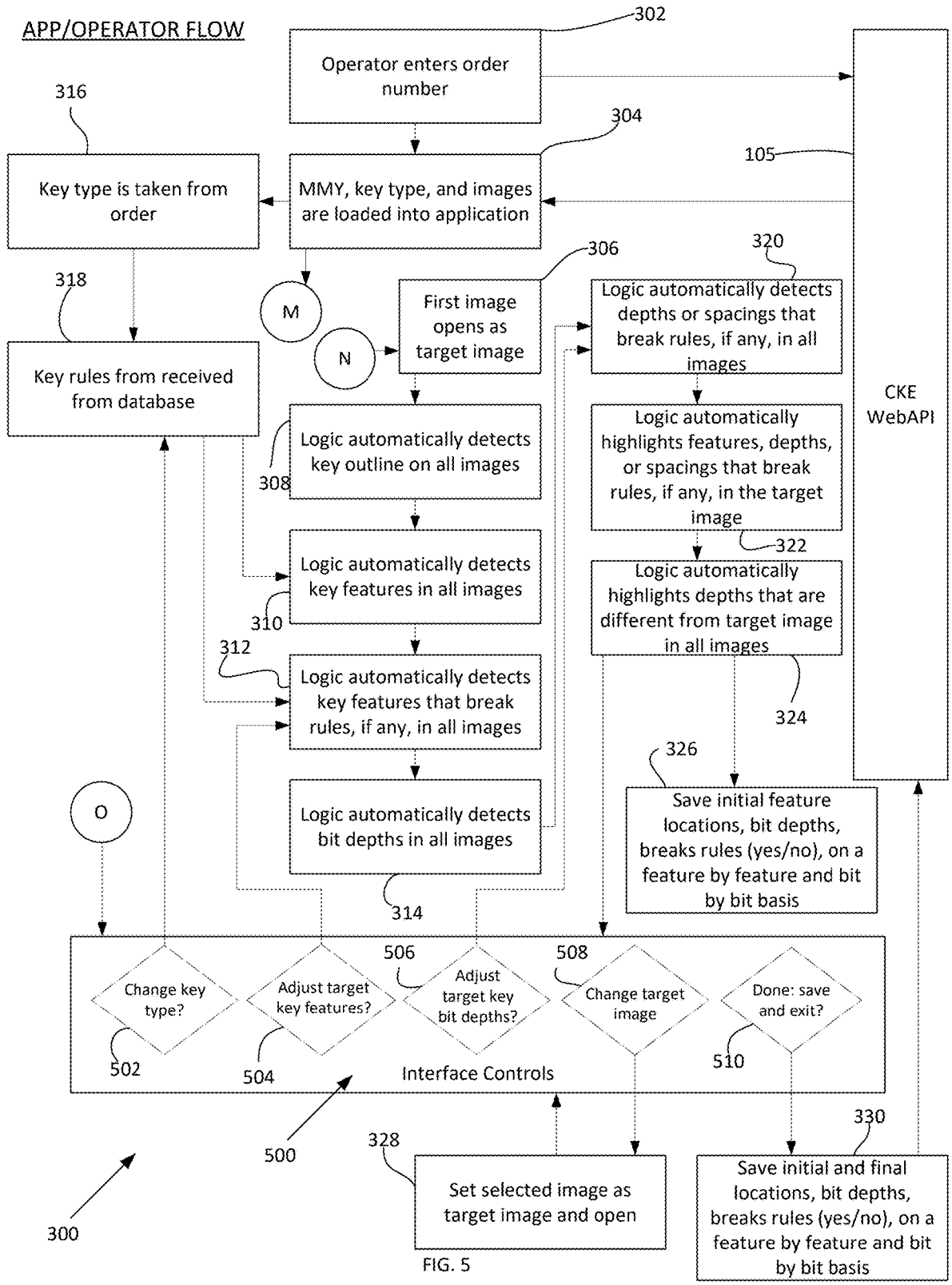
FIGS. 5 and 12 provide flowcharts illustrating an exemplary process for obtaining and processing a captured image of a master key according to the system and application of the present invention.
Figure 6:
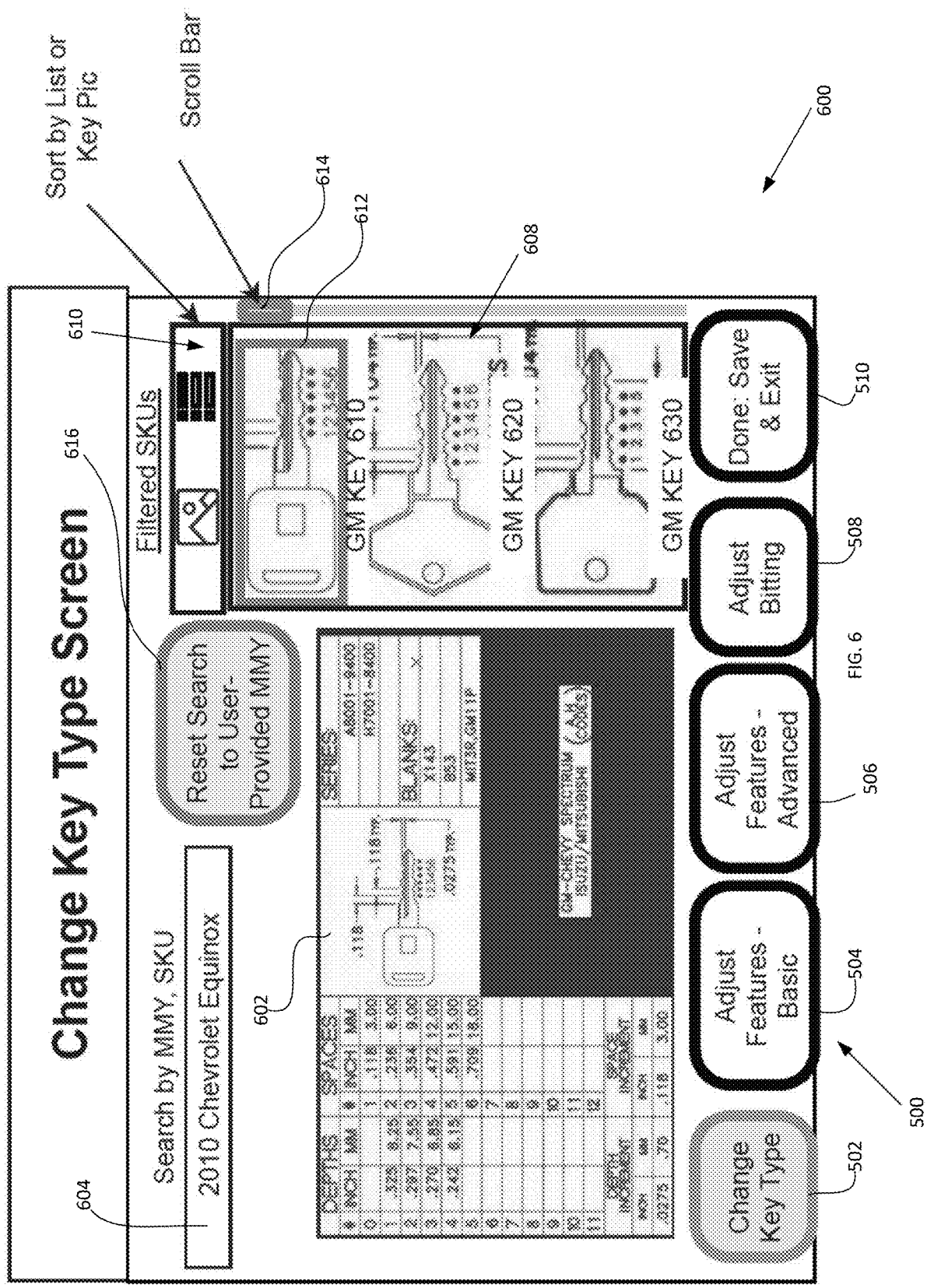
FIGS. 6-9 provide a series of user interface screens relating to an exemplary process for a user ordering a replacement master key according to the present invention.
Figure 7:
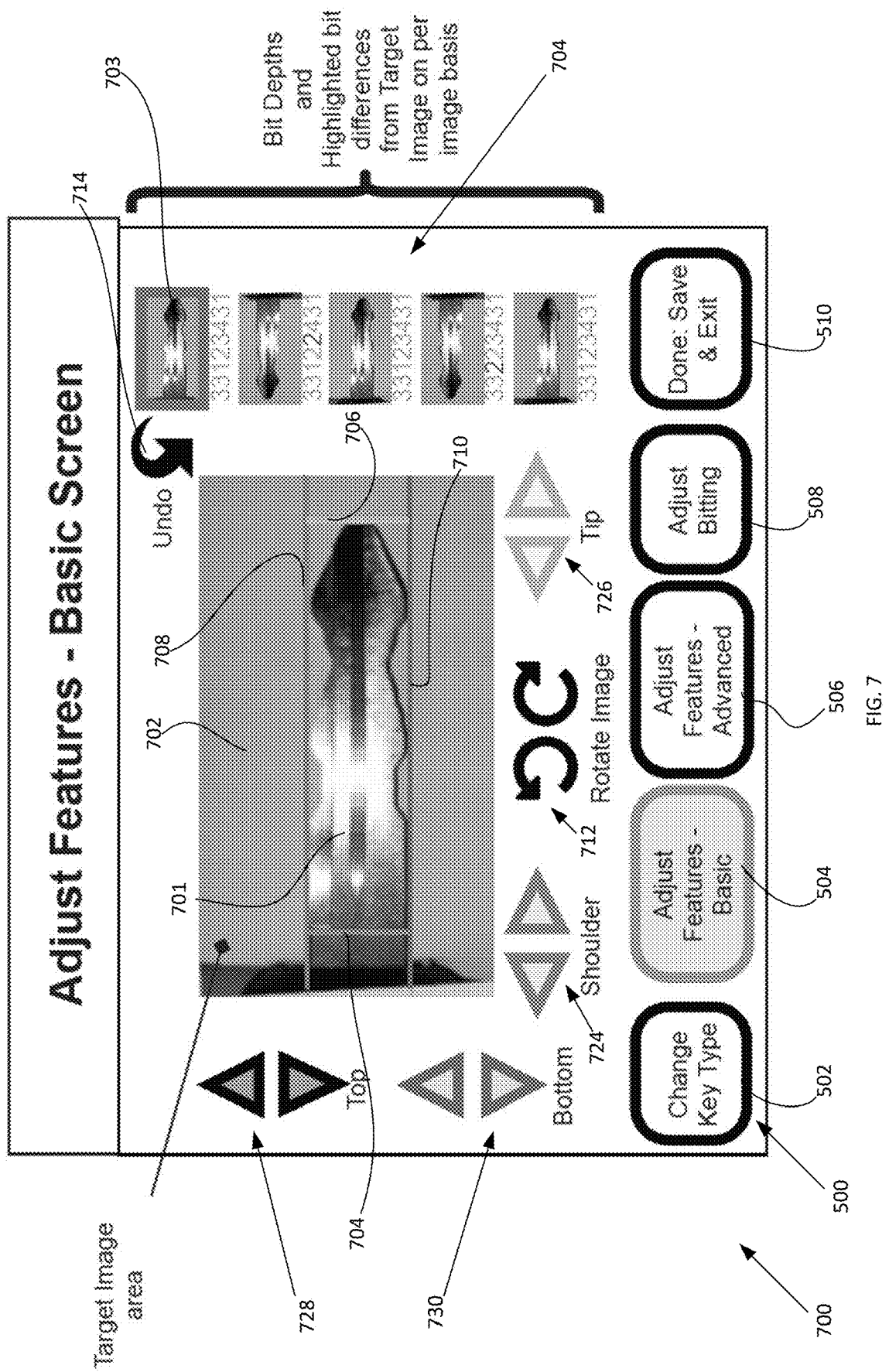
Figure 8:
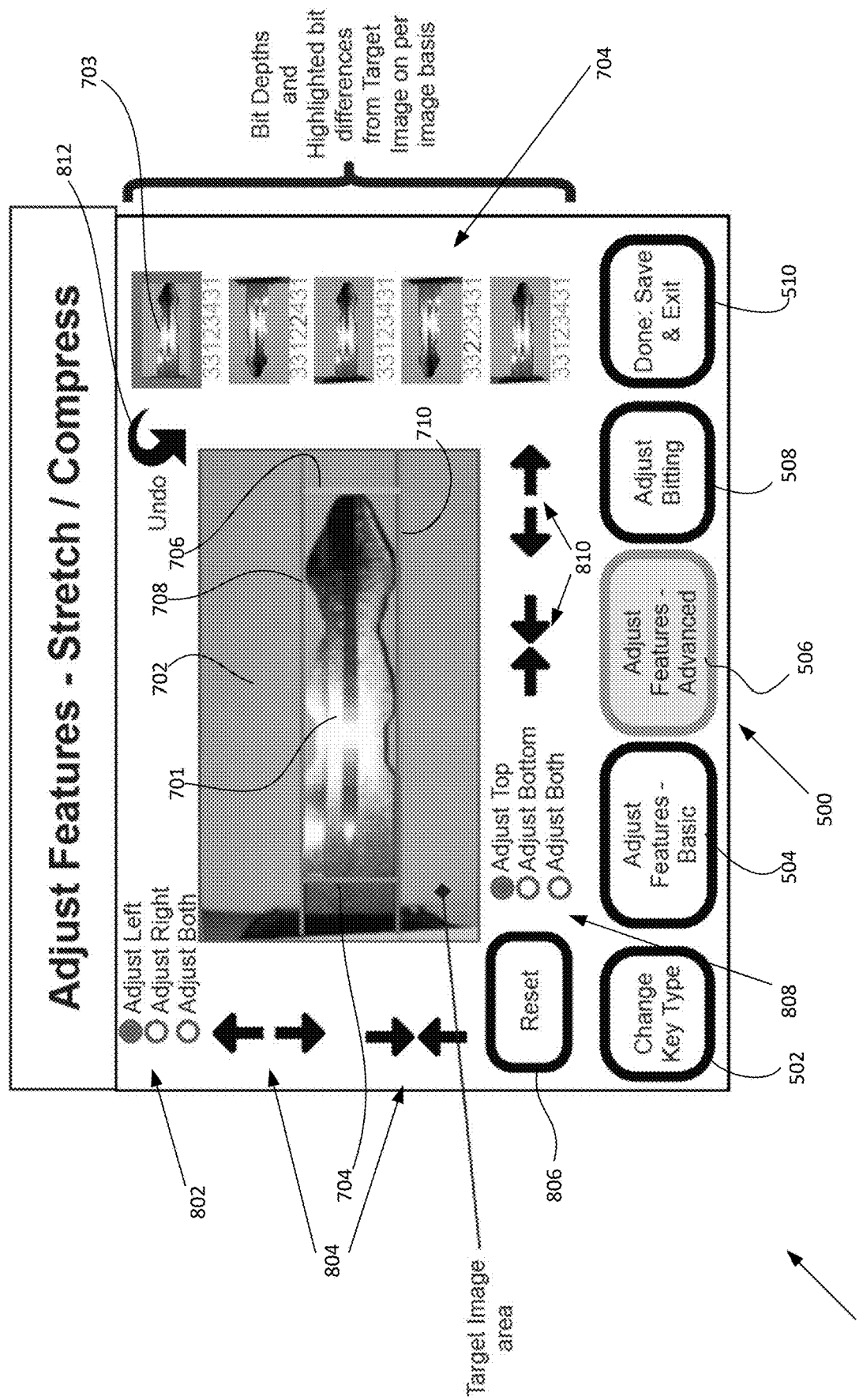
Figure 9:
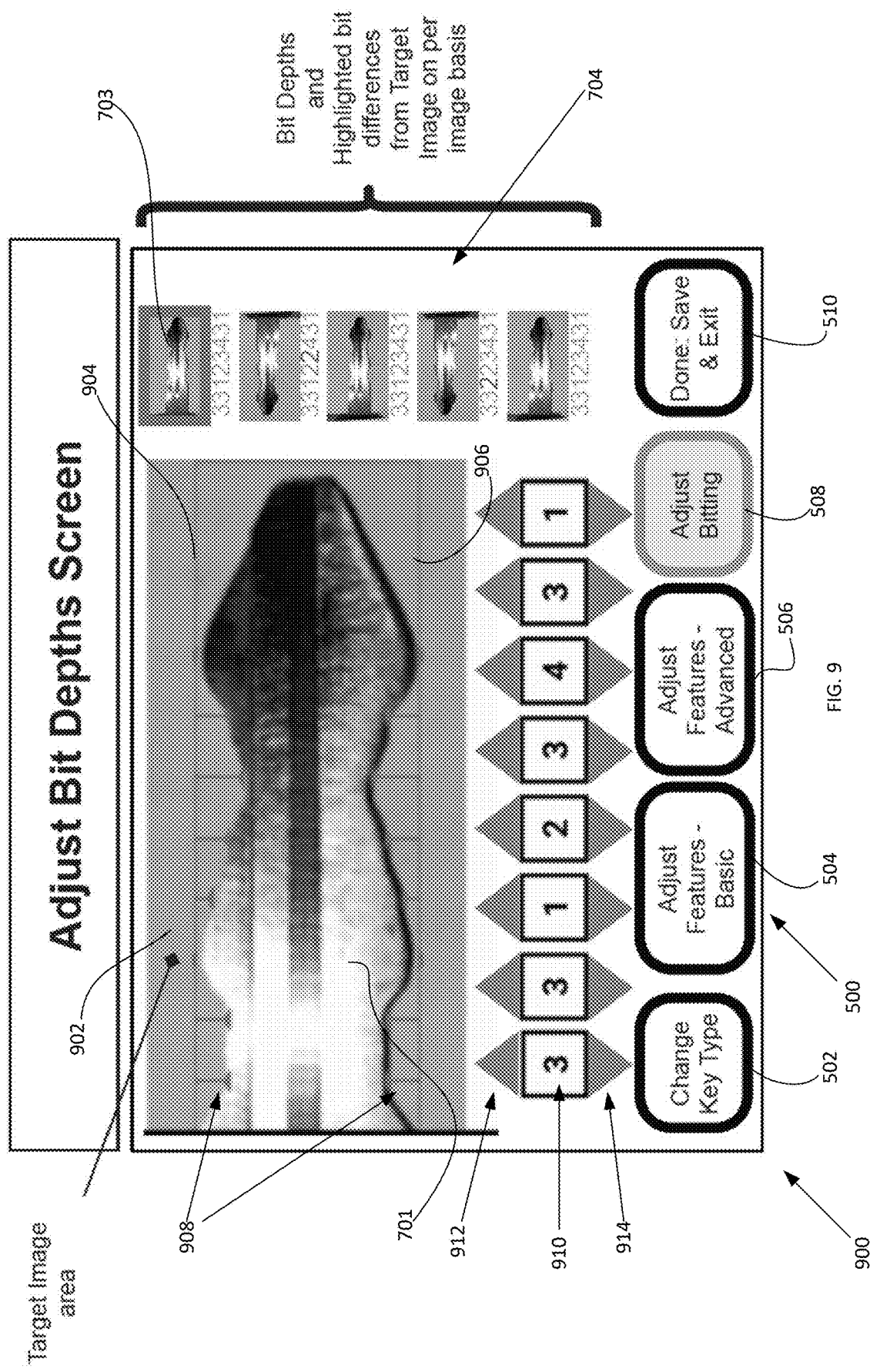

With reference now to FIG. 5 a flowchart illustrating an exemplary process 300 for obtaining and processing a captured image of a master key according to the system and application of the present invention is provided. Control of the process 300 is performed by the user interface controls 500. The primary user interface controls are the change key type control 502 which is shown in FIG. 6, the adjust target key features control 504 which is shown in FIG. 7, the adjust target key bit depths control 506 which is shown in FIG. 8, the change target image 508 which is shown in FIG. 9, and the save and exit control 510. The change key type control 502 initiates the may initiate the process at step 302 or may re-initiate the process at steps 310 or 312.

Figure 12:
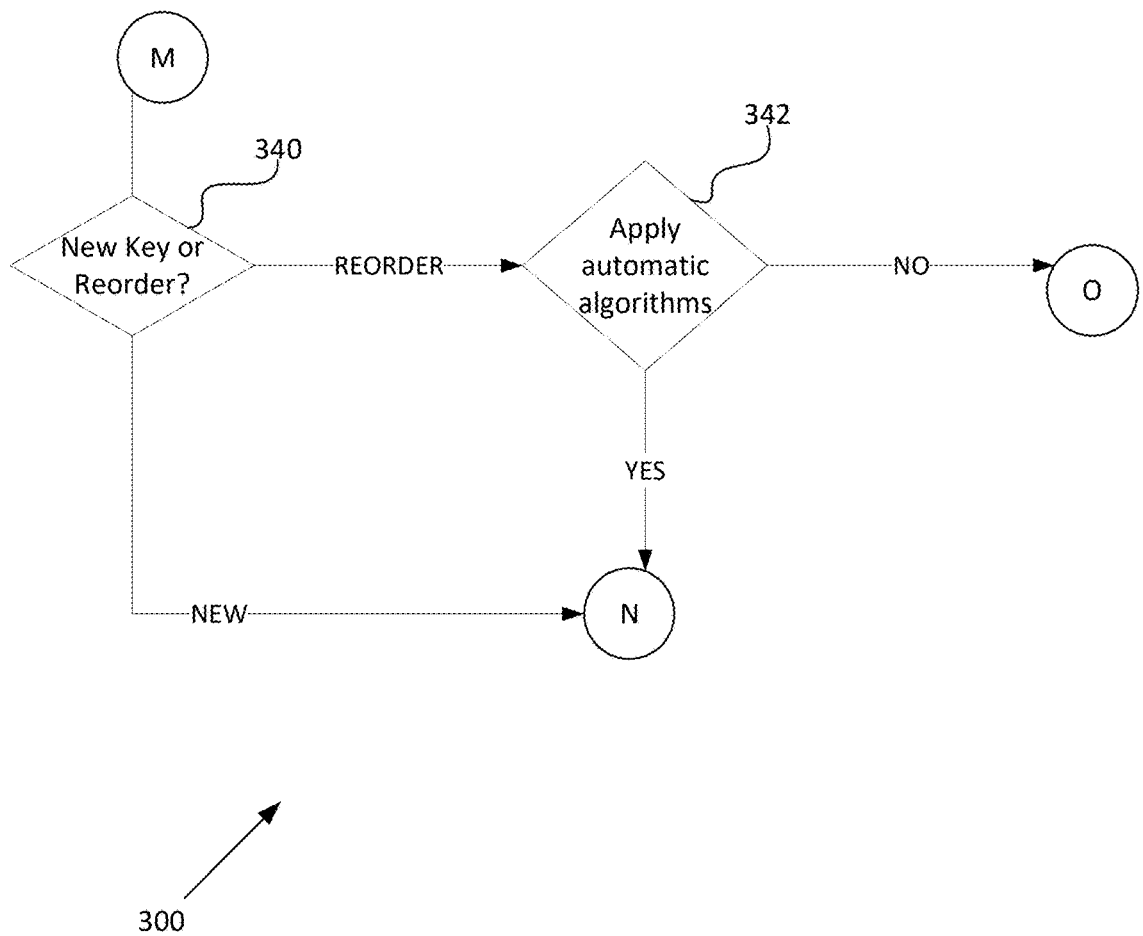

In step 302, an operator enters or accesses an order number for a user order of a replacement key blade copy in the iKeyless WebAPI 105. In step 304, the vehicle MMY, key type, and a set of images are loaded into the application and in step 316 the key type is taken from the order information and is used in step 318 to access and retrieve a set of key rules from a database. In step 340, shown in FIG. 12, the user selects whether the order is for a new key or is for a reorder. If the order is a new key, the process continues to step 306 shown in FIG. 5. If the order is a reorder, the user selects whether to apply automatic algorithms to key images in step 342. This is disabled by default for reorders, is enabled by default for new orders, but may be changed at the option of the user. If the user determines to not apply automatic algorithms, the user is presented with the user interface controls 500 as shown in FIGS. 6-9. If the user determines to apply the automatic algorithms the process continues in step 306.

In step 306 the first image in the set of images associated with the order is opened and designated as a target image. Alternatively, the best image of the set of images is identified and designated as the target image based on image clarity, key alignment, and other factors.

In step 308 the system automatically identifies and determines the outline of the master key in all images in the set of images by the key outline module 132. Then in step 310 the system automatically determines a set of key features for the master key in each image by the key feature module 144. The system, by the key feature module 144, in step 312 determines if any of the determined set of key features for any image break or violate any rule in the set of key rules retrieved from the database and identifies these breaks from the rules as a set of faults or discrepancies. In step 314 the system, by the key depth and bitting module 136, automatically detects a set of key bitting information, such as key bit depths, in all images. The key depth and bitting module 136 in step 320 determines if any key bitting depths, spacings, or heights break any rules from the set of key rules and identifies these breaks from the rules as a set of faults or discrepancies. In step 322 any features, depths, spacings, or heights that break any rules are highlighted in the target image. In step 324 the system automatically highlights any depths in any image other than the target image that are different from the depths in the target image. Then in step 326 the set of key features, the set of key bitting information, and any identified faults or discrepancies, are saved on a bit-by-bit and feature-by-feature basis.

Processing of the image or images of the master key to be copied comprises evaluating the image according to key bitting rules and determining if the key bittings determined from the image or images is within acceptable tolerances for a particular key type. This will eliminate invalid key bitting information from a damaged or worn master key from which a key blade copy may not be cut. If an invalid bitting is determined from an image of a master key, an outline of the master key as determined by the system may be modified to create the best possible outline. A set of target key features are determined from this best possible outline to be used to create the key blade copy. The target key features comprise at least blade rotation, blade top line, blade bottom line, blade tip endpoint, blade shoulder line, shoulder to tip length, and blade width. This set of target key features is then compared to key bitting rules and tolerances to determine if the modified outline is an acceptable outline conforming to key bitting rules and tolerances from which a key blade copy may be cut. For each key type or model of key in the system, the key bitting rules contain measurements and parameters such as number of bits, shoulder to first bit, bit to bit spacing, bit heights as measured from a key-type-defined reference line, and maximum adjacent cut specs (MACS).

The captured image is analyzed in real-time to ensure the image is of the quality needed for further processing and provides input back to the user. The application may notify the user that the picture of sufficient quality or may inform the user that they need to recapture the image. Image processing algorithms to identify required key cuts includes software and algorithms that validates the captured image of the master key in real time. Additional key alignment algorithms for getting clean edge and surface images are also used. Another algorithm and process are used to identify and fix worn or damaged keys. This algorithm may identify and fix an outline of the master key in the captured image and adjust or geometrically change the outline including by adjusting the cut height to compensate for worn contours. Additional processes may be used to provide for better processing of a captured image, and these processes include limiting or compensating for image parallax, applying digital filters to the captured image, applying color or greyscale modes for higher quality images, applying edge detection and contrast enhancement filters or algorithms, and applying sequential imaging and filtering algorithms.

The change target image control 508 provides for a user or operate to change the image that is selected as the target image in step 328. The save and exit control 510 starts step 330 and saves initial and final locations of the master key in the target image, bit depths, any faults or discrepancies, and other information on a bit-by-bit and feature-by-feature basis.

With reference now to FIGS. 6-9 a series of user interface screens relating to an exemplary process for a user ordering a replacement master key according to the present invention are provided. FIG. 6 provides a user interface 600 associated with the change key type control 502. The user interface 600 comprises an information window 602, a search field 604, a filtered SKUs field 608, and a reset function 616. The information window 602 provides information about a selected key type, such as selected key 612 in the filtered SKUs field 608. This may be information such as standard sizing and bitting information, vehicle information, and other key feature information. The selected key 612 is one of a set of keys shown in the filtered SKUs field 608 that are shown based on the information provided by a user for a replacement key order or based on a search entered in the search field 604. The keys in the filtered SKUs field 610 may be scrolled through using the scroll bar 614 or may be further filtered or displayed differently using the functions of the toolbar 610.

FIG. 7 provides a user interface 700 associated with the adjust target key features control 504. This user interface 700 provides for the adjustment of basic key features for the master key 701 in the target image 703. The target image 703 is the selected image from the set of images 704. For each image that is not the target image 703, key bitting on a bit-by-bit basis that is not consistent with the target image is indicated below the image. The target image 703 is also displayed in the information window 702. A top line 708, bottom line 710, shoulder line 704, and tip line 706 are overlaid on the master key 701 in the information window 702. Each line represents a bounds for the key blade of the master key 701 and may be adjusted by an associated set of user interface elements. The top line adjustment elements 728 and bottom line adjustment elements 730 provide for user adjustment of the respective top line 708 and bottom line 710 by the user in an upwards or downwards direction. The shoulder line adjustment elements 724 and tip line adjustment elements 726 provide for user adjustment of the respective shoulder line 704 and tip line 706 by the user in a left or right direction. The target image 703 of the master key 701 may also be rotated clockwise or counterclockwise using the rotation elements 712.

FIG. 8 provides a user interface 800 associated with the change target image controls 508. This user interface 800 provides for the adjustment of the target image 703 by a set of user interface controls to obtain the best possible target image from which to extract key features and key bitting information. The selection elements 802 provide for user adjustment of the image 703 at the shoulder line 704 (left), tip line 706 (right), or at both lines. The selection elements 808 provide for user adjustment of the image 703 at the top line 708 (top), bottom line 710 (bottom), or at both lines. The vertical stretching and compressing elements 804 provide for user adjustment of the image by compressing or expanding it in a vertical or Y direction based on the selections in the selection elements 802 and 808. The horizontal stretching and compressing elements 810 provide for user adjustment of the image by compressing or expanding it in a horizontal or X direction based on the selections in the selection elements 802 and 808. A single change may be undone by the undo element 812, or all changes may be reverted by the reset element 806.

FIG. 9 provides a user interface 900 for adjusting the bitting or bit depths 908 and is associated with the adjust target key bit depths control 506. The master key 701 in the target image 703 is shown in the bitting adjustment window 702. A top line 904 and bottom line 906 define the maximum height of the bitting for the master key 701. The bit depths 908 may be individually adjusted using the controls 910, 912, and 914. The control 910 displays the current bit depth and enables specific entry of a particular bitting depth at a specific point on the master key 701 and each element of the control 910, and also the controls 912 and 914, corresponds to a particular bit in shown in the bit depths 908. The controls 912 enable each bit depth to be incremented by one and the controls 914 enable each bit depth to be decremented by one.

After a user has interacted with each user interface 600, 700, 800, and 900, all changes to the target image, the key features, and the key bitting information may be saved using the control 510. The initial selection of the target image, the initially determined key features, and the initially specified bitting depths are all determined automatically by the system and are also be automatically corrected by the system. The user may adjust the features and bitting determined by the system if the user determines that the automatically identified information is incorrect or inconsistent.

The key cutting service may include traditional delivery services ("key-by-mail" of courier service) and/or drone-based delivery. For example, a central key cutting facility may be distributed across geographic areas to provide drone-based delivery directly or via a fleet of vehicles having drone delivery capabilities to deliver duplicate keys cut according to the processes described herein. In one manner of operation, the key cutting service cuts keys and sends a drone from a van or other drone nesting location to a customer within a predetermined range of the van or other nesting location. The drone delivers the duplicate key and returns to the van or other nesting location, e.g., a drone "hive." In one key aspect of this delivery service, a customer stranded and unable to operate their vehicle may order a duplicate key, capture master key image data or engage a key bank repository of stored master key data (e.g., known master key bitting information and/or other encoded or encrypted key information-such as keyless entry information), the central or distributed key cutting service generates a duplicate key and delivers a duplicate key based on the user order entered via a mobile device directly to the user via the van-based or nesting location-based drone delivery service. In this example, customer delivery location may be based on GPS provided information. For example, a stranded customer may not know or may not have available a street address on which to base delivery. GPS information may be used in lieu of street address location.

Figure 13:
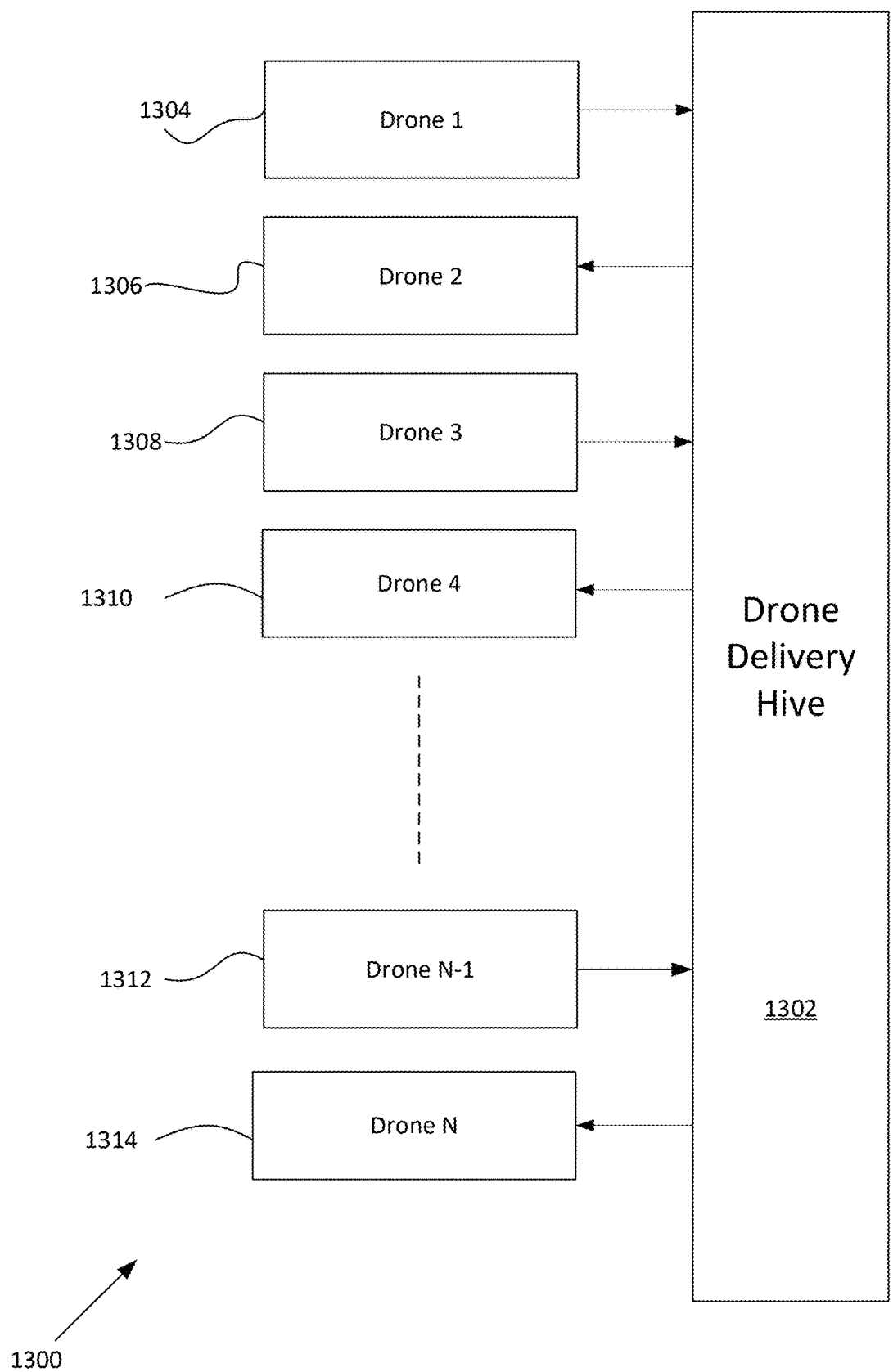
FIG. 13 provides a block diagram illustrating an exemplary central delivery system for use in delivering key products fabricated according to the present invention.

FIG. 13 illustrates an exemplary Delivery System 1300 having a central Drone Delivery Hive 1302 adapted to send, receive, and store a fleet or set of individual drone delivery devices such as Drones 1-N (1304-1314). The Delivery System 1300 may be co-located with a key cutting or fabricating facility as described herein. The fleet of drones may be comprised of drones of differing shapes and sizes and having different load capacities to more efficiently utilize the delivery devices in light of the key product(s) being delivered. For instance, in the instance of a delivery intended for a retail hub and having multiple key orders and key products to be delivered, then a relatively larger drone may be scheduled, reserved and used. Retail hubs may include traditional facilities such as AutoZone, Pep Boys, or big box type stores or distribution centers. Also, the delivery system may serve traditional service centers such as auto dealerships. Such retail delivery drones may be reserved for retail hub use and put in service based on a set delivery schedule associated with such retail recipients. Smaller drone delivery devices may be used in instances of individual deliveries involving one or few products within such devices load capacity.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A system for creating a key blade copy of a master key based on a captured image of the master key, the system comprising:

a central server having a processor, a memory, and a set of instructions stored on the memory and executed by the processor, the central server connected to a communication network and adapted to receive a set of information from a handheld computing device over the communication network, the set of information comprising:

a set of user information:

a set of information associated with the master key;

and a set of one or more images of the master key captured by a camera that is integral with the handheld computing device;

a database accessible by the central server and configured to store records related to keys;

the processor configured to execute the stored instructions and access key related information stored in the database to cause the central server to:

designate an image from a set of images as a target image;

retrieve a set of key rules from the database;

determine a set of key features of the master key from the target image;

identify a first set of faults in the set of key features by comparing the set of key features to the set of key rules;

determine a set of key bitting information from the set of key features;

store the set of key bitting information and the set of key features in the database; and create the key blade copy of the master key based on the set of stored key bitting information and the set of key features.

2. The system of claim 1, wherein the processor is further configured to process executable instructions to cause the server to:

identify a second set of faults in the set of key bitting information by comparing the set of key bitting information to the set of key rules, wherein the set of key rules includes one or more of maximum bit value, minimum bit value, number of bits, and a maximum adjacent cut specification; and mark the first set of faults and the second set of faults in the target image of the master key.

3. The system of claim 2, wherein the processor is further configured to process executable instructions to cause the server to correct the first set of faults and the second set of faults to generate a best possible geometric outline.

4. The system of claim 3, wherein the processor is further configured to process executable instructions to cause the server to update the set of key features and the set of key bitting information based on the best possible geometric outline.

5. The system of claim 3, wherein the processor is further configured to process executable instructions to cause the server to correct the first set of faults and the second set of faults and adjust cut height and bitting to compensate for worn contours on the master key.

6. The system of claim 1, wherein the processor is further configured to process executable instructions to cause the server to capture a set of transponder information related to the master key.

7. The system of claim 1, wherein the processor is further configured to process executable instructions to cause the server to:

receive an order from a user for the key blade copy;

create the key blade copy for the user based on the received order; and ship the key blade copy to the user.

8. The system of claim 1, wherein the processor is further configured to process executable instructions to cause the server to apply an image processing technique to the captured image, the image processing technique selected from the group consisting of: compensating for image parallax, applying digital filters to the captured image, applying color or greyscale modes for higher quality images, applying edge detection and contrast enhancement filters or algorithms, and applying sequential imaging and filtering algorithms.

9. The system of claim 1, wherein the processor is further configured to process executable instructions to cause the server to prompt a user to capture an additional set of images of the master key.

10. The system of claim 1, wherein the processor is further configured to process executable instructions to cause the server to identify a faulty image from the set of images based on information associated with an image capture device used to capture the set of images.

11. The system of claim 1 further comprising a drone service adapted to deliver a key product directly to a customer location or to an affiliated retail location based on user input, GPS data or stored location data.

* * * * *